Aug. 23, 1932.  W. T. MacDONALD  1,873,843
POROUS MEDIUM FOR AERATING APPARATUS
Filed March 18, 1929
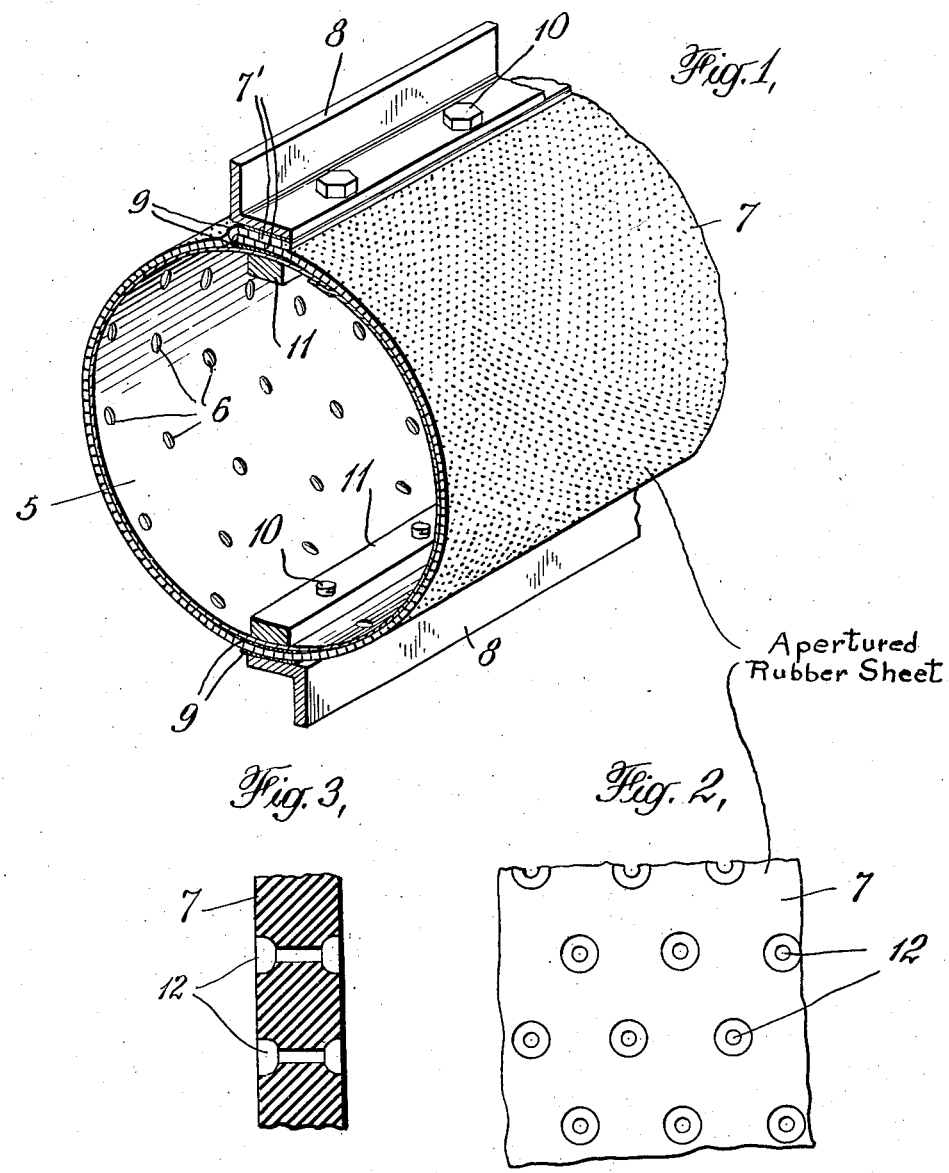
INVENTOR
William T. MacDonald
BY
Pennie, Davis, Marvin & Edmonds
ATTORNEYS Patented Aug. 23, 1932

1,873,843

UNITED STATES PATENT OFFICE

WILLIAM T. MacDONALD, OF DOUGLAS, ARIZONA, ASSIGNOR TO THE GENERAL ENGINEERING COMPANY, OF SALT LAKE CITY, UTAH, A CORPORATION OF UTAH

POROUS MEDIUM FOR AERATING APPARATUS

Application filed March 18, 1929. Serial No. 347,811.

This invention relates to aerating apparatus and has for its object the provision of an improved porous medium therefor.

Aerating apparatus of the character to which the present invention relates is provided with some suitable means for introducing a finely disseminated gas into a body of liquid or pulp. This means usually consists of a porous medium through which the gas is forced into the liquid in the form of a vast number of minute bubbles, preferably uniformly distributed over the contemplated aerating surface of the porous medium. Canvas has been extensively used as such porous medium. A typical example of an aerating apparatus employing canvas as the porous medium is the well-known Callow pneumatic flotation machine. While the present invention is peculiarly adapted to pneumatic flotation machines, it may be advantageously applied to any aerating apparatus for introducing air or other gas in a finely disseminated state into a liquid or pulp.

The present invention is characterized by the provision as the porous medium in an aerating apparatus of a sheet of rubber, or equivalent elastic material, having a multiplicity of definite apertures providing channels for the passage therethrough of minute bubbles or streams of the aerating fluid. It is essential that the apertures be definite holes or perforations through the rubber, as distinguished from mere prick marks or needle perforations such as result from perforating a rubber sheet with a needle or the like. To this end, in perforating a rubber sheet for the purposes of the invention a certain small amount of rubber is actually removed from the sheet in making each perforation. This may advantageously be accomplished by forming the perforations in the rubber sheet with a punching tool of appropriate size and character to remove a portion of the rubber and leave a definite aperture or clear hole of a measurable effective diameter.

The operation of perforating the rubber sheet is facilitated by covering each side of the sheet with a thin sheet of stiff paper or equivalent material. In the perforating operation, the punch, or equivalent perforating tool, cuts a definite and clear hole through each covering sheet of a diameter conforming to the external diameter of the perforating tool. In passing through the sheet of rubber, the perforating tool makes a cut approximating its external diameter at each side of the sheet, but within the sheet the rubber is apparently stretched by the tool so that the effective diameter of the hole cut by the tool is considerably less than the external diameter of the tool itself. As a consequence, the longitudinal section of the perforation or aperture through the rubber is of dumb-bell configuration. In practice, it has been found that the rubber removed in making each aperture or perforation has the shape of a double-headed tack or of a dumb-bell, and the diameter of the restricted or neck portion of this removed rubber is approximately 1/3rd to 1/4th the external diameter of the punch employed in making the aperture, when working on rubber sheets about 1/16th to 3/32nds inch in thickness.

While it is characteristic of the invention that the apertures in the rubber sheet are definite or clear holes, nevertheless these apertures are relatively minute in size. Thus, I have determined that the effective diameter of the aperture should not be greater than about 1/50th of an inch, nor smaller than about 1/200th of an inch. By effective diameter, I mean the limiting or minimum diameter of the aperture as a whole. In an aperture of dumb-bell shape in longitudinal section, this would be the diameter of the neck or restricted portion of the dumb-bell.

Appropriate distribution and spacing of the apertures is necessary in order to obtain effective and uniform aeration. In general, it is desirable that the apertures be uniformly distributed over the contemplated aerating surface of the rubber sheet and as close together as practicable. Too close spacing of the apertures may unduly weaken the rubber sheet. Moreover, mechanical difficulties of perforating limit, to some extent, close spacing of the apertures. From my experiments and investigations, I have determined that there should be not less than about 50 and not more than about 500 apertures per square inch of aerating area in the rubber sheet.

In practicing the invention I prefer to use sheets of high grade gum rubber. Other equivalent elastic materials may, however, be provided with apertures as hereinbefore described, and used as the porous medium in the practice of the invention. Various rubber containing materials may thus be used instead of gum rubber. When using sheets of gum rubber, I have found a thickness of about 1/16th of an inch entirely satisfactory. For economic reasons it is undesirable to use rubber sheets of a thickness exceeding about 1/4 inch, while rubber sheets less than 1/64th of an inch in thickness are usually too delicate or fragile for ordinary plant practice.

I have obtained excellent results in practice with sheets of so-called pure gum rubber approximately 1/16th inch in thickness provided with from 150 to 350 apertures per square inch. The effective or clear diameter of each of these apertures was from 1/100th to 1/150th of an inch. Such perforated rubber sheets or blankets have been continuously used in pneumatic flotation machines for over four months without detrimental clogging or blanketing of the apertures. One of the great disadvantages of canvas as a porous medium in such aerating apparatus is the ease and rapidity with which the canvas becomes coated with slimy solids, particularly lime compounds and the like. Such slimy solids do not tend to adhere to rubber with anywhere near the ease or tenacity that they adhere to canvas. Another peculiar advantage of rubber or equivalent elastic material, is the fact that it is possible to make a hole or aperture through the rubber whose neck or clear diameter is considerably smaller than the diameter of the punch or perforating tool used to produce the aperture.

In the accompanying drawing, I have illustrated the invention applied to the rotor of a pneumatic flotation machine of the type disclosed in the United States patent of John C. MacIntosh, No. 1,608,896, dated November 30, 1926. In the drawing Fig. 1 is a fragmentary perspective view of the rotor, Fig. 2 is a greatly enlarged plan view of the porous medium of the invention, and Fig. 3 is a transverse section of the porous medium taken through the centers of two adjacent apertures.

Referring to the drawing, the frame 5 of the rotor is a sheet metal cylinder 5 provided with uniformly distributed holes or perforations 6. The holes 6 may advantageously be 3/8ths of an inch in diameter, uniformly spaced approximately one inch apart. A perforated rubber sheet or blanket 7 surrounds the exterior surface of the perforated metal cylinder 5, and is secured to the cylinder by diametrically positioned angle plates 8. Protective strips of felt 9 or other suitable material are interposed on opposite sides of the rubber sheet along the places of clamping contact of the rubber sheet between the plates 8 and the drum 5. Each plate 8 is secured by bolts 10 to a cooperating bar 11 soldered or brazed to the inside of the drum 5. In Fig. 1, the overlapping edges 7' of the perforated rubber sheet are clamped between the upper plate 8 and the drum.

In Figs. 2 and 3, the perforated rubber sheet 7 is illustrated on an enlarged scale to show the characteristic features of what I now consider the preferred type of aperture or perforation. It will be seen that rubber is actually removed from the sheet 7 in making each aperture 12. Fig. 3 shows the dumb-bell configuration of the longitudinal section of the apertures. In making each aperture, more rubber is removed adjacent to each side of the sheet than in the interior of the sheet, so that the effective diameter of the aperture is determined by the size of the hole at the restricted or interior portion.

I claim:—

1. The combination in an apparatus of a porous medium comprising a sheet of elastic material provided with a multiplicity of uniformly distributed definite apertures whose longitudinal section is of dumb-bell configuration.

2. The combination in an aerating apparatus of a porous medium comprising a sheet of elastic material provided with a multiplicity of uniformly distributed apertures, the longitudinal section of said apertures being of dumb-bell configuration with a definite measurable effective diameter but not exceeding about 1/50th of an inch.

3. The combination in an aerating apparatus of a porous medium comprising a sheet of rubber provided with from 50 to 500 definite apertures per square inch, each of said apertures having an effective diameter of from 1/50th to 1/200th of an inch and being of dumb-bell configuration in longitudinal section.

4. The combination in an aerating apparatus of a porous medium comprising a sheet of elastic material provided with a multiplicity of uniformly distributed definite apertures whose longitudinal section is of dumb-bell configuration, said sheet of elastic material being freely supported so that it is substantially free to stretch, expand and contract as a whole.

5. The combination in an aerating apparatus of a porous medium comprising a sheet of elastic material provided with a multiplicity of uniformly distributed definite apertures whose longitudinal section is of dumbbell configuration, said sheet of elastic material being freely supported on a cylindrical device rotatable within the aerating apparatus so that the elastic material is substantially free to stretch, expand and contract as a whole.

In testimony whereof I affix my signature.

WILLIAM T. MacDONALD.